United States Patent Office 3,511,624
Patented May 12, 1970

3,511,624
PROCESS FOR PREPARING METHANE-
CONTAINING GASES
Kelvin James Humphries and Thomas Alan Yarwood,
Solihull, England, assignors to The Gas Council, London, England, a British body corporation
No Drawing. Filed Feb. 20, 1967, Ser. No. 617,049
Claims priority, application Great Britain, Feb. 24, 1966,
8,257
Int. Cl. C10k 3/04; C07c 9/04
U.S. Cl. 48—197
11 Claims

ABSTRACT OF THE DISCLOSURE

The catalytic methanation in at least two stages of mixtures containing carbon oxides, hydrogen, steam and at least 25% by volume of methane. The mixture is passed in a first stage over a methanation catalyst which is at a temperature of from 200° C .to 450° C.; steam is then partially removed from the mixture, which is then passed in a second stage over a methanation catalyst which is at a temperature within a range lower than the temperature of the mixture leaving the first stage; steam and carbon dioxide are subsequently removed from the mixture. The amount of steam present in each stage is at least sufficient to prevent carbon deposition on the catalyst.

---

This invention relates to a process for making a gas containing a high proportion of methane, in particular, a gas consisting almost wholly of methane, so that it is similar to or interchangeable with natural gas, by catalytic synthesis from the methane-rich gas produced by the medium-temperature gasification of light hydrocarbons (for instance, light petroleum distillate) in steam, or from a gas of similar composition.

A preferred process for the medium-temperature gasification of light hydrocarbons (for instance, light petroleum distillate) is described and claimed in our British patent specification No. 820,257. The process comprises passing a mixture of the predominantly paraffinic, hydrocarbons and steam in vapour form at a temperature above 350° C. through a bed of a nickel catalyst under atmospheric or superatmospheric pressure such that the bed is maintained by the reaction at temperatures within the range of 400° C. to 550° C.

The catalyst employed may be a nickel-alumina catalyst formed by co-precipitation of nickel and aluminium salts followed by reduction of the nickel in the mixture to the metallic state, to which catalyst is added a minor proportion of an oxide, hydroxide or carbonate of an alkali or alkaline earth metal. In certain circumstances, the linear velocity of the reaction mixture passing through the catalyst bed may advantageously not exceed 0.3 feet per second, which also permits improvements in the composition and state of the catalyst. The preheat temperature of the reactant mixture may be as high as 600° C., in which case the catalyst bed temperature may rise above 550° C.

Methods are known for increasing the life of the catalyst by increasing the proportion of steam in contact with it.

The resulting gases contain steam, hydrogen, carbon oxides (more $CO_2$ than CO) and a substantial proportion of methane. This proportion may be decreased, by further reaction over a catalyst maintained at a higher temperature, to form, for example, town gas, or may be increased by methanation at a lower temperature. Thus, specification No. 820,257 states " . . . the methane-rich gas produced by the process of this invention may be subjected to the action of a nickel catalyst at a lower temperature, for example, at 400° C. or below, to bring about the formation of methane by reaction between carbon dioxide, carbon monoxide and hydrogen present in the gas."

The present invention relates to a particular process for performing the step thus described, aimed especially at the production of gas consisting substantially wholly of methane.

In applying methane synthesis to gases containing hydrogen and carbon oxides for the production of methane-rich gas, it is well-known to be necessary to operate at low temperatures and preferably at elevated pressures since equilibrium then favours the desired result. But the reactions between hydrogen and carbon oxides are strongly exothermic, so that if low temperatures are to be maintained and equilibrium reached at the lowest practicable temperature, provision must be made to remove the heat liberated.

It is furthermore necessary to use a catalyst having sufficient activity to cause the methanation reactions to proceed, preferably substantially to equilibrium. Its activity will be protected from deterioration due to exposure to high temperatures by the methods, to be described, which are necessary to secure low-temperature operation.

It is a feature of the present application of methanation that in the gas supplied carbon dioxide can conveniently predominate in the carbon oxides, whereas methanation is more usually applied to a synthesis gas in which the principal carbon oxide is the monoxide.

The present invention provides a process for making a gas containing a high proportion of methane from a reactant mixture comprising methane, hydrogen, carbon monoxide, carbon dioxide, and steam, the methane concentration being at least 25% by volume of the mixture, which method comprises passing the reactant mixture in a first methanation stage over a methanation catalyst the temperature of which is from 200° C. to 450° C., removing at least part of the steam from the mixture leaving the first methanation stage, passing the mixture in a second methanation stage over a methanation catalyst the temperature of which is within a range which is lower than the exit temperature of the mixture from the methanation catalyst of the first methanation stage so that further methanation takes place, the amount of steam present in each of the stages being at least sufficient to prevent carbon deposition on the catalyst, and subsequently removing carbon dioxide and any remaining steam from the mixture.

Those skilled in the art will understand that the temperatures of the gases in contact with the methanation catalysts must be sufficient for those catalysts to cause reaction to take place at an adequate rate. These temperatures will be different for different catalysts, but may be determined by experiment. Also, it will be clear that the composition of the gaseous mixtures entering each stage must be such that carbon deposition does not take place at the temperature prevailing in the catalyst beds. The reactions involved are governed by well-known equilibria, as will be more fully described below.

The product gas will usually contain at least 90.0% and preferably at least 95% or even 97.5% or 98.5%, by volume of methane after removal of the steam and the carbon dioxide.

The concentration of methane present in the reactant gas entering the first methanation stage should be at least 25% and preferably between 25 and 50% by volume.

The preferred concentration ranges for the other constituents of the reaction mixture entering the first methanation stage are (by volume): $CO_2$: from 5 to 20%;

CO: from 0 to 5%; $H_2$: from 5 to 30%; and $H_2O$: from 30 to 60%.

In the process as applied to gas produced by the method of our above-mentioned specification or any of its subsequent variants, the gas used is that which leaves the steam-hydrocarbon gasification catalyst and it consists of a mixture of methane, carbon oxides, hydrogen and undecomposed steam in which mixture methane and steam are the principal constituents, and in which the proportion of carbon dioxide is considerably greater than that of carbon monoxide. The mixture is generally substantially at equilibrium at the outlet of the catalyst. In the preferred embodiment of the process, it is cooled, before admission to a first methanation stage incorporating a suitable methanation catalyst, to a temperature which is sufficiently low for methane synthesis to occur to a substantial extent when it is admitted to that stage, but which is not so low that there is insufficient catalytic activity for reaction to proceed at an adequate rate. In general, the temperature of the methanation catalyst is within the range 200° C. to 450° C., and preferably within the range 250° C. to 400° C. The methanation reaction preferably proceeds in this first methanation stage to the extent that in it is produced at least one half of the mass (or standard volume) of methane that is produced in the whole process of the invention. Some of the steam can be allowed to condense before admission to the first methanation stage, but this is not necessary and conditions can be chosen so that no steam is removed at this point.

A consequence of the methanation reaction is that the temperature of the gas rises and a temperature gradient is established along the catalyst bed, rising in the direction of gas flow; but the maximum temperature reached is not greater than the value imposed (as is described in the 49th Report of the Joint Research Committee of the Gas Research Board and the University of Leeds, page 32 onwards) by the prior presence of methane in the synthesis gas. As methane is produced, the temperature rises until the gases are in equilibrium at the temperature reached when, in the absence of provision for cooling of the catalyst bed, no further change can occur. The maximum temperature reached is the equilibrium temperature; in general the higher the initial methane content, the lower is the equilibrium temperature. The gases leaving the first methanation stage are cooled so that some, preferably the greater part, of the steam is condensed, the object being to leave only sufficient steam in the gases to prevent carbon deposition. The gaseous mixture is then admitted to a second methanation stage incorporating a suitable catalyst at a temperature at which methane synthesis can restart. Preheating may be necessary after the condensation stage; that is to say, the temperature to which the gases are cooled may be below that at which it is desired to admit them to the second stage. More methane is formed and again the temperature rises to a maximum. The same methanation catalyst temperature considerations apply in the second stage as in the first, provided always that the range is below the exit temperature of the gases from the first methanation stage. Preferably, the maximum temperature reached in the second stage does not exceed 350° C.

If desired, cooling and methanation can be repeated but two stages of these operations are generally sufficient to produce a gas which consists almost entirely of methane and carbon dioxide, from which, by known methods of carbon dioxide removal, a gas can be produced which consists almost entirely of methane.

The process is preferably operated at above atmospheric pressure, for instance, within the range 5 to 100 atmospheres, but higher pressures may be used if required, so long as undesired condensation of steam is avoided. A more preferred range is 20 to 80 atmospheres. The use of the higher pressures within these ranges may be especially advantageous when it is desired to feed the gases into a high-pressure distribution system such as that used for the distribution of natural gas. A convenient temperature of admission of the gas mixture to the methanation stages is within the range 250 to 300° C. Lower temperatures may be used so long as catalysts of sufficient activity are chosen, and can result in the final gas approaching pure methane in composition still more closely.

Particularly suitable catalysts for the methanation stages are active nickel-alumina catalysts, which may be prepared by co-precipitation. The two stages may, but need not, contain catalysts of the same composition. The temperatures at which the gases are admitted to the two stages may be, but need not be, the same.

In catalytic gasification reactions involving carbon oxides, steam is used, as is known, to control the relative proportions of the monoxide and dioxide through the reaction

so that the Boudouard reaction

is prevented from moving to the right and causing carbon deposits and catalyst blockages. The minimum concentration of steam supplied to both stages of the process of the invention is such that when the gases reach equilibrium in the reactions

and

there is a surplus of carbon dioxide over carbon monoxide in relation to the Boudouard equilibrium.

The composition and temperature of the gases leaving the gasification stage of the process described in specification No. 820,257 is such that there is no danger of carbon deposition, there being more carbon dioxide in relation to carbon monoxide than equilibrium requires. As the gases are cooled, there is no material change in composition, and the margin of safety in respect of carbon deposition becomes narrower and eventually vanishes. This is because the partial pressure of carbon monoxide that is stable in the presence of a given partial pressure of carbon dioxide progressively diminishes, as the temperature falls, due to the change of the equilibrium constant of the Boudouard reaction with temperature. But it is not necessary for the cooling to stop before the point at which carbon deposition becomes thermodynamically possible because when the gases reach an active catalyst the methanation reactions which immediately start, and which consume carbon monoxide, are sufficient to reduce the carbon monoxide concentration below a level at which carbon formation is possible.

Since steam is a product of the synthesis reactions, its continuing presence would prevent the attainment of the desired final concentration of methane. But after the gases have traversed the first stage, and the carbon monoxide concentration has been reduced to a very low level indeed relatively to that of carbon dioxide, by the attainment of equilibrium at a comparatively low temperature, it becomes possible to remove a large part or nearly the whole of the steam by cooling and partial condensation, without incurring any risk of carbon deposition in the subsequent methanation stage. In this stage it is then possible to consume almost all the residual hydrogen in methanation, leaving only a surplus of carbon dioxide which can readily be removed.

It is a feature of the present invention that it is not necessary to provide for cooling of either catalyst bed in order to manufacture gas containing more than 90 or 95 percent of methane, or even more than 97.5 or 98.5 percent, after removal of the steam and carbon dioxide, so long as methanation is carried out at a sufficiently low temperature, and in the preferred embodiment of the process this is achieved by suitable control of the temperatures of the gases entering the methanation stages.

It is, however, possible, though it is not preferred, to provide for cooling, at least of the first stage, preferably using internal cooling with the methanation catalyst being in the form of a fluidised bed; our copending British patent application No. 553/66 describes suitable apparatus in which a reactant mixture is distributed into a fluidised bed of the methanation catalyst, the bed being cooled by a cooling fluid flowing through a series of pipes in the bed. When such a system is used, the gases entering the methanation stage need not be cooled to as low a temperature as in the preferred manner of employing the invention.

It is possible to use a fluidised bed in the second methanator stage in a similar way, with or without internal cooling, though there is no advantage in doing so. This is because it is necessary for the gases leaving the first methanating stage to be cooled to a temperature such that a large proportion of the steam is condensed so that it can be rejected as water. This temperature is generally below the temperature at which gases are admitted to the second stage, so that the most convenient mode of operation is to bring the gas temperature up to the required level after this cooling step and to operate the second methanator without internal cooling and with the catalyst in the form of a fixed bed.

The following examples illustrate the invention.

EXAMPLE I

Dry methane-rich gas which had been made by the catalytic gasification in steam of light petroleum distillate under pressure at catalyst temperatures of 400 to 550° C. was drawn from storage and steam was added to it so as to simulate the wet gas as it issues from the reactor.

The mixture was admitted at 300° C. and 25 atmospheres pressure to a column of catalyst 0.175 in. diameter and 2 ft. long, operating adiabatically, and a temperature rise of approximately 90° C. was observed.

For experimental convenience, the products were cooled to room temperature and the nearly dry gas was mixed with an appropriate amount of steam before entry, again at 300° C. and 25 atmospheres pressure, to a second methanation stage of the same dimensions as the first. The catalyst bed in this stage was maintained by external control at 338° C., the calculated adiabatic final temperature.

The catalyst in both stages was co-precipitated nickel-alumina catalyst, prepared generally as in U.S. application No. 351,190, filed Mar. 11, 1964 (now abandoned), in the name of Percival et al., containing 75 percent of nickel (calculated as metal) and 1.6 percent of potassium (calculated as metal) which had been added as potassium carbonate, the percentages being of the total of the nickel, alumina and potassium in the catalyst.

The following results were obtained.

Space velocities (standard volumes of dry exit gas per volume of catalyst space per hour):

Stage 1 _____ 7,100
Stage 2 _____ 6,800

GAS COMPOSITIONS (PERCENT BY VOLUME)

| | Inlet Stage 1 wet | Outlet Stage 1 wet | Inlet Stage 2 wet | Outlet Stage 2 wet | Outlet Stage 2 dry | Outlet Stage 2 dry and $CO_2$ free |
|---|---|---|---|---|---|---|
| $CO_2$ | 11.9 | 10.3 | 18.2 | 17.5 | 21.0 | |
| $CO$ | 0.7 | 0.1 | 0.2 | 0.1 | 0.1 | 0.1 |
| $H_2$ | 12.4 | 2.7 | 4.8 | 0.9 | 1.1 | 1.4 |
| $CH_4$ | 30.6 | 35.2 | 62.3 | 64.6 | 77.8 | 98.5 |
| $H_2O$ | 44.4 | 51.7 | 14.5 | 16.9 | | |

These results were obtained after 2,585 hours operation; the experiment was continued for a further 500 hours and was ended voluntarily.

EXAMPLE II

To a pilot plant which had been constructed for the operation of the catalytic gasification of light distillate with steam under pressure two methanation stages, designed for adiabatic operation, were added with provision for cooling before each. It was found convenient, as in Example I, to cool the gases nearly to atmospheric temperature between the stages and to reintroduce the appropriate amount of steam.

Light distillate gasification stage

Catalyst bed:
    Depth, ft.—4
    Diameter, in.—5.4
Hydrocarbon feedstock—Light petroleum distillate, F.B.P. 115° C.
Steam/distillate ratio, by weight—2.0
Pressure, p.s.i.g.—350

Methanation stages

Catalyst: Co-precipitated nickel-alumina catalyst containing 75 percent of nickel and 0.2–0.3 percent potassium (on the same basis as in Example I).

| Stage | 1 | 2 |
|---|---|---|
| Catalyst bed: | | |
| Depth, ft | 5 | 4.5 |
| Diameter, in | 5.75 | 6.35 |
| Pressure, p.s.i.g | 350 | 350 |
| Temperature, ° C.: | | |
| Inlet | 300 | 300 |
| Outlet | 370 | 340 |
| Space velocity, standard vols. of dry gas produced/vol. of catalyst space/hr | 5,010 | 4,360 |
| Rate of gas production (dry, before $CO_2$ removal), cu. ft./hr | | 4,323 |

GAS COMPOSITION (PERCENT BY VOLUME)

| | Inlet stage 1 wet | Outlet stage 1 wet | Inlet stage 2 wet | Outlet stage 2 wet | Outlet stage 2 dry | Outlet Stage 2 dry and $CO_2$ free |
|---|---|---|---|---|---|---|
| $CO_2$ | 10.85 | 10.20 | 19.05 | 17.90 | 20.25 | |
| $CO$ | 0.55 | 0.05 | 0.10 | 0.0 | 0.0 | 0.0 |
| $H_2$ | 8.95 | 2.55 | 4.75 | 0.80 | 0.9 | 1.15 |
| $CH_4$ | 30.95 | 36.05 | 67.25 | 69.65 | 78.85 | 98.85 |
| $H_2O$ | 48.70 | 51.15 | 8.85 | 11.65 | | |

The steam supply to the first stage (ignoring the reactions) is equivalent to 2.0 lb. per lb. of initial distillate, there being no condensation after the gasification reactor, and that to the second stage corresponds on the same basis to 0.7 lb./lb.

The above results were obtained after 268 hours of operation of the methanation stages. It was continued under substantially the same operating conditions for 1,138 hours in all, and after 1,008 hours gases of the following compositions were obtained:

GAS COMPOSITIONS (PERCENT BY VOLUME)

| | Inlet Stage 1 wet | Outlet Stage 1 wet | Inlet Stage 2 wet | Outlet Stage 2 wet | Outlet Stage 2 dry | Outlet Stage 2 dry and $CO_2$ free |
|---|---|---|---|---|---|---|
| $CO_2$ | 9.5 | 9.35 | 18.9 | 17.8 | 20.25 | |
| $CO$ | 0.55 | 0.1 | 0.25 | 0.0 | 0.0 | 0.0 |
| $H_2$ | 6.45 | 2.2 | 4.5 | 0.9 | 1.0 | 1.25 |
| $CH_4$ | 30.5 | 33.1 | 67.0 | 69.25 | 78.75 | 98.75 |
| $H_2O$ | 53.0 | 55.25 | 9.35 | 12.05 | | |

There was thus no evidence of change in the performance of the methanating catalysts.

The experiment on which Example III is based demonstrated the applicability of the invention to the production of gas containing a yet higher proportion of methane than in the experiment of Example II, by using lower inlet temperatures, for the methanation stages. Between the end of the one experiment and the start of the second, the light distillate feedstock and the steam: distillate ratio were changed, and certain related operating conditions were studied.

EXAMPLE III

After the end of the experiment described in Example II and the changes in operating conditions mentioned above, the inlet temperatures to the methanation stages were lowered, the catalyst remaining undisturbed.

The details of the experiments are indicated below.

Light distillate gasification stage

Catalyst bed:
  Depth, ft.—4
  Diameter, in.—5.4
Hydrocarbon feedstock—Light petroleum distillate F.B.P. 139° C.
Steam/distillate ratio, by weight—1.6
Pressure, p.s.i.g.—350

METHANATION STAGES

| Stage | 1 | 2 |
|---|---|---|
| Catalyst bed: | | |
| Depth., ft | 5 | 4.5 |
| Diameter, in | 5.75 | 6.35 |
| Pressure, p.s.i.g | 350 | 350 |
| Temperature, °C.: | | |
| Inlet | 250 | 250 |
| Outlet | 353 | 275 |
| Space velocity, standard vols. of dry gas produced/vol. of catalyst space/hr | 5,179 | 4,590 |
| Rate of gas production (dry, before $CO_2$ removal), cu. ft./hr | | 4,555 |

GAS COMPOSITION (PERCENT BY VOLUME)

| | Inlet Stage 1 wet | Outlet Stage 1 wet | Inlet Stage 2 wet | Outlet Stage 2 wet | Outlet Stage 2 dry | Outlet Stage 2 dry and $CO_2$ free |
|---|---|---|---|---|---|---|
| $CO_2$ | 13.4 | 12.25 | 21.45 | 20.0 | 21.45 | |
| CO | 0.7 | 0.15 | 0.25 | 0.1 | 0.1 | 0.15 |
| $H_2$ | 10.2 | 1.5 | 2.65 | 0.25 | 0.25 | 0.3 |
| $CH_4$ | 38.2 | 41.35 | 72.45 | 72.95 | 78.2 | 99.55 |
| $H_2O$ | 37.5 | 44.75 | 3.2 | 6.7 | | |

Operation under these conditions was started after the catalysts had been in use for a total of 1,893 hours and was carried on for a further 117 hours, no attempt being made to continue for a prolonged period. The results reported were obtained after 108 hours operation under the set conditions. Though there was no evidence of catalyst deterioration, or of any inability of the methanation catalysts to function at the lower temperature after use at the higher one, it would be preferable to use fresh catalysts if it were desired to operate for a long time at an inlet temperature of 250° C.

We claim:

1. A process for making a gas containing a high proportion of methane from a reactant mixture comprising methane, hydrogen, carbon monoxide, carbon dioxide, and 30 to 60% by volume of steam, the methane concentration being at least 25% by volume of the mixture, which method comprises passing the reactant mixture in a first methanation stage over a methanation catalyst the temperature of which is from 200° C. to 450° C., removing at least part of the steam from the mixture leaving the first methanation stage and cooling the mixture, passing the mixture in a second methanation stage over a methanation catalyst the temperature of which is within a range the upper limit of which is lower than the exit temperature of the mixture from the methanation catalyst of the first methanation stage so that further methanation takes place, the amount of steam present in each of the stages being at least sufficient to prevent carbon deposition on the catalyst, and subsequently removing carbon dioxide and any remaining steam from the mixture.

2. A process as claimed in claim 1 wherein the reactant mixture entering the first methanation stage comprises from 25 to 50% by volume of methane, from 5 to 20% by volume of carbon dioxide, from 0 to 5% by volume of carbon monoxide, and from 5 to 30% by volume of hydrogen.

3. A process as claimed in claim 1 wherein the methanation catalyst temperature, in each instance, is from 250° C. to 400° C.

4. A process as claimed in claim 1 wherein the second stage methanation catalyst temperature is from 250° C. to 350° C.

5. A process as claimed in claim 1 wherein the process is carried out at a pressure of 5 to 100 atmospheres.

6. A process as claimed in claim 1 wherein the process is carried out at a pressure of from 20 to 80 atmospheres.

7. A process as claimed in claim 1 wherein the amount of steam present in the mixture, after steam has been removed after the first methanation stage, is not substantially more than is required to prevent carbon deposition on the catalyst.

8. A process as claimed in claim 1 wherein the methanation catalyst is a nickel-alumina catalyst prepared by coprecipitation.

9. A process as claimed in claim 1 wherein the reactant mixture from the first methanation stage is first cooled and then reheated prior to being introduced into the second methanation stage.

10. A process as claimed in claim 1 wherein the product gas contains at least 90% methane.

11. A process as claimed in claim 1 wherein the product gas contains at least 95% methane.

References Cited

UNITED STATES PATENTS

| 2,665,288 | 1/1954 | Odell | 260—449 |
| 3,379,505 | 4/1968 | Holmes et al. | 260—449.6 X |

FOREIGN PATENTS

| 146,110 | 11/1920 | Great Britain. |
| 820,257 | 9/1959 | Great Britain. |
| 791,946 | 3/1958 | Great Britain. |

JOSEPH SCOVRONEK, Primary Examiner

U.S. Cl. X.R.

48—214; 260—449.6